March 28, 1933.  H. PAQUETTE  1,902,888
FROST ELIMINATOR FOR VEHICLES
Filed Oct. 26, 1931
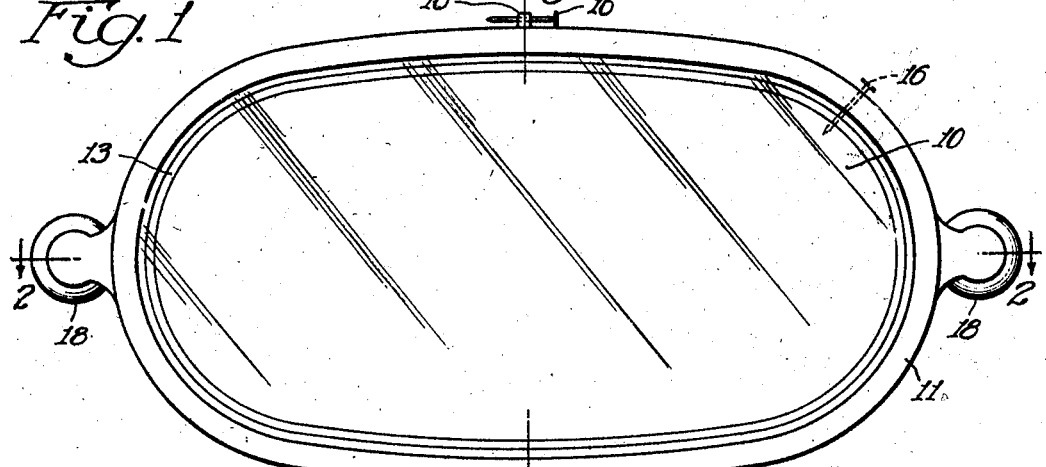
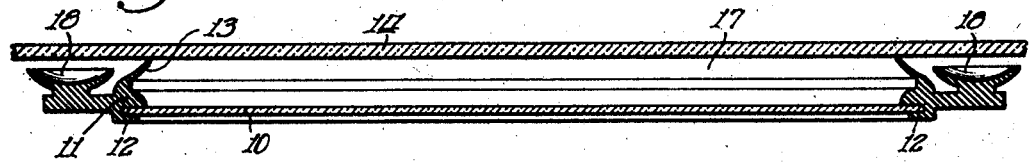
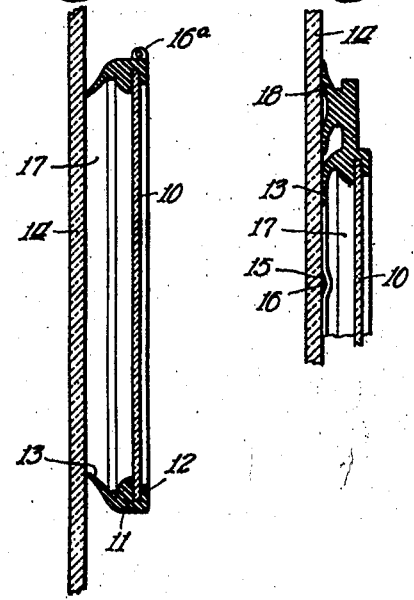
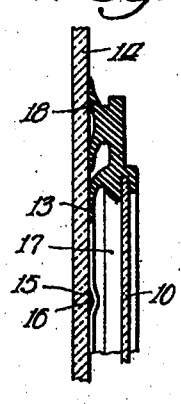
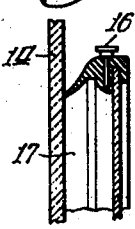
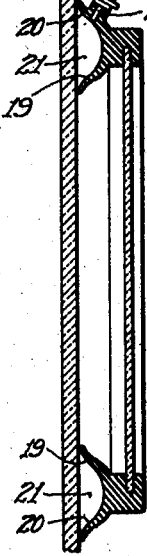
Inventor
Herman Paquette Patented Mar. 28, 1933

1,902,888

UNITED STATES PATENT OFFICE

HERMAN PAQUETTE, OF CHICAGO, ILLINOIS

FROST ELIMINATOR FOR VEHICLES

Application filed October 26, 1931. Serial No. 571,194.

This invention relates generally to devices for preventing the accumulation of frost and condensate upon windows and refers more particularly to devices of this type especially designed for use upon vehicle windshields.

One of the principal objects of this invention is to provide a construction of the foregoing character with means for fastening the same to transparent panels such as windshields and contemplates accomplishing this result in such a manner as to preclude accidental disengagement of the device from its support and at the same time permit the device to be readily applied to or removed from its support.

In addition to the foregoing, the invention contemplates a construction having numerous other advantageous features which will be made more apparent as this description proceeds, especially when considered in connection with the accompanying drawing, wherein:

Figure 1 is a front elevation view of a device constructed in accordance with this invention;

Figure 2 is a sectional view taken substantially on the line 2—2 of Figure 1;

Figure 3 is a cross sectional view taken substantially on the line 3—3 of Figure 1;

Figure 4 is a view similar to Figure 2 showing the device in assembled relation with its support;

Figure 5 is a view similar to Figure 3 showing a slightly modified form.

Figure 6 is a view similar to Figure 2 showing another modified form of construction.

The device illustrated herein is of the type adapted to be held in assembled relation with a window or vehicle windshield by means of suction and in general, comprises a translucent panel mounted within a frame preferably fashioned from a resilient material such as rubber or rubber compositions. As is usually the case, the marginal edges of the transparent panel are secured within the frame and the latter is provided with means operable to create a suction between the transparent panel and window upon assembling the former with the latter to securely fasten the device to the window. The arrangement is such that when the device is assembled with the windshield as previously set forth, a partial vacuum is provided between the panel and portions of the windshield surrounded by the frame or in other words, the air surrounding the device is prevented from entering the aforesaid space with the result that the accumulation of frost upon that portion of the windshield surrounded by the frame will be prevented.

The success of devices of the above character depends largely upon the ability of the construction to maintain a partial vacuum between the two transparent panels or in other words, to seal the space therebetween in the assembled position thereof irrespective of vibrations and shocks imparted thereto. Accidental disengagement of devices of the above type from vehicle windshields has been a common source of trouble in the trade and has materially impeded the commercial use of such devices. The inability of prior devices to remain in assembled relation with windows subjected to vibrations and sudden shocks such as vehicle windshields is due not only to the inadequate securing means, but frequently to the particular contour of the device which is extremely important, especially when suction is depended upon to secure the device to the windshield. For example if the device is polygonal in shape having more or less sharp corners, extreme difficulty is encountered in effecting an extended area of contact of the marginal portions of the device with the window or windshield to maintain the space encircled thereby sealed. The present invention contemplates eliminating the foregoing objections by providing improved means for fastening devices of the above character to a window or windshield and also by providing a construction having a shape best suitable for the creation of suction between the transparent panel of the device and adjacent portions of the windshield.

Referring now more in detail to the drawing and with special reference to the device illustrated in Figures 1 to 4, inclusive, it will be noted that this device comprises a transparent panel 10 and a frame 11 encircling the transparent panel 10. The frame 11 is preferably formed of a resilient material such as rubber or rubber composition and is provided with a continuous channel-shaped groove 12 in the inner wall thereof of sufficient width to yieldably grip the marginal edge portions of the panel 10 for maintaining the latter in assembled relation with the frame. Extending inwardly from the rear marginal edge of the frame and preferably formed integral therewith is a resilient continuous flange 13 adapted to engage the adjacent side of a window 14 when the device is in assembled relation therewith. The flange 13 is preferably oval in contour as viewed in Figure 1 so as to be free from relatively sharp corners or turns which would tend to interfere with effecting a continuous area of contact between the flange and adjacent side of the window 14. However, it is to be understood that the flange 13 may be circular, if desired, or any other suitable shape wherein short corners and turns are eliminated.

With the construction as thus far described, it will be apparent that when it is desired to assemble the device upon the window 14, the rear marginal edge of the flange is engaged with the adjacent side of the window 14 and pressure applied thereto by moving the device bodily toward the window 14. By pressing the flange in engagement with the window 14 as shown in Figure 4, the air in the space 17 between the transparent panel and window will be forced out of a suitable opening 15 caused by a nail 16 inserted between window 14 and flange 13 as shown in dotted lines in Figure 1 and also in Figure 4. After the device has been moved to its limit toward the window 14 and prior to releasing the pressure on the device, the opening 15 is closed by withdrawing the nail 16 whereupon the pressure on the device may be relieved. A suitable lug 16a is formed integral with the frame member 11 to hold the nail when not in use. Owing to the resiliency of the flange 13, the device will move slightly away from the window 14 upon releasing the pressure thereon with the result that the volume of the space 17 will be slightly increased causing a sub-atmospheric pressure to be set up in this space. The arrangement is such that the atmospheric pressure acting upon the entire outer area of the device more than compensates for the pressure tending to move the device away from the window 14, and as a consequence, the device is maintained in assembled relation with the window.

In order to insure efficient securing of the device to the windshield, I provide auxiliary means in the form of vacuum cups 18 for assisting in securely fastening the device to the windshield. The vacuum cups 18 are preferably arranged upon opposite sides of the frame and as shown herein are formed integral with the latter. As will be observed from Figure 4, the cups 18 are so positioned with respect to the flange 13 that when the latter is engaged with the window as previously stated, the cups will also be engaged with the window to force the air out of the same so that when the pressure on the device is released, a partial vacuum will be set up in the cups as well as in the space 17. In other words, the construction is such that only one operation is required to secure both the cups and the flange 13 to the window.

When it is desired to remove the device from the window 14, the nail 16 is merely inserted between the window 14 and flange 13 permitting air to flow into the space 17 and thereby destroy the partial vacuum therein. After the nail 16 has been inserted and the vacuum in space 17 destroyed, the device is merely tilted to destroy the vacuum in the cups 18. Thus, from the foregoing it will be apparent that the above construction not only provides for securely fastening the device to a window, but at the same time permits the device to be readily assembled therewith and removed therefrom.

Figure 5 illustrates the use of a plug 16b in place of a nail to destroy the vacuum in space 17. The modification illustrated in Figure 6 differs from the foregoing construction in that the rear edge of the frame is provided with laterally spaced resilient flanges 19 and 20, respectively, cooperating to form a continuous groove 21. As shown in Figure 6, the outer flange 20 is provided with an opening 22 therethrough establishing communication between the interior of the groove and the atmosphere and normally closed by means of a removable plug 23. The arrangement is such that when pressure is applied to the device to secure the same to the window, the plug 23 is removed permitting the air within the groove 21 to escape out of the opening 22. The plug 23 is then reinserted within the opening 22 and the pressure upon the device released. Releasing the applied pressure upon the device causes the device to move slightly forwardly owing to the tendency of the resilient flanges to assume their normal positions and as a consequence, increases the area of the groove 21 to such an extent that a partial vacuum is set up in this groove which is sufficient to securely hold the device in engagement with the window. When it is desired to remove the device from the window, the plug 23 is merely removed from the opening 22 permitting air to flow into the groove 21 to destroy the partial vacuum therein and thereby permitting the device to be easily disengaged from the window.

What I claim as my invention is:

1. A device of the class described comprising a panel formed of transparent material adapted to be secured to a window in spaced parallel relation thereto, a frame surrounding the marginal edges of said panel and secured thereto, a continuous resilient flange extending rearwardly from the frame and adapted to be pressed against the window upon applying the device to the latter, and means operable upon pressing the flange against the window to permit the air in the space defined by the flange to escape.

2. A device of the class described comprising a panel formed of transparent material adapted to be secured to a window in spaced parallel relation thereto, a frame surrounding the marginal edges of said panel and secured thereto, a continuous resilient flange extending rearwardly from the frame and adapted to be pressed against the window upon applying the device to the latter, said frame having an opening therethrough establishing communication between the space defined by the flange and the atmosphere permitting air to escape from the space upon pressing the flange in engagement with the window, and means for closing said opening to prevent air from entering the space defined by the flange when the applied pressure thereon is relieved.

3. A device of the class described comprising a panel formed of transparent material adapted to be secured to a window in spaced parallel relation thereto, a frame encircling the marginal edges of said panel and having a portion secured thereto, a continuous resilient flange extending rearwardly from the frame and adapted to be pressed against the window upon applying the device to the latter, means operable upon pressing the flange against the window to permit the air in the space defined by the flange to escape and also operable to prevent entrance of air into the space upon releasing the applied pressure on the device for creating means carried by said frame and engageable with the window for assisting the flange and securing the device to the window.

HERMAN PAQUETTE.